March 3, 1959  J. L. PLYMALE  2,876,359
MAGNETIC SUPPORT
Filed June 28, 1955  3 Sheets-Sheet 1
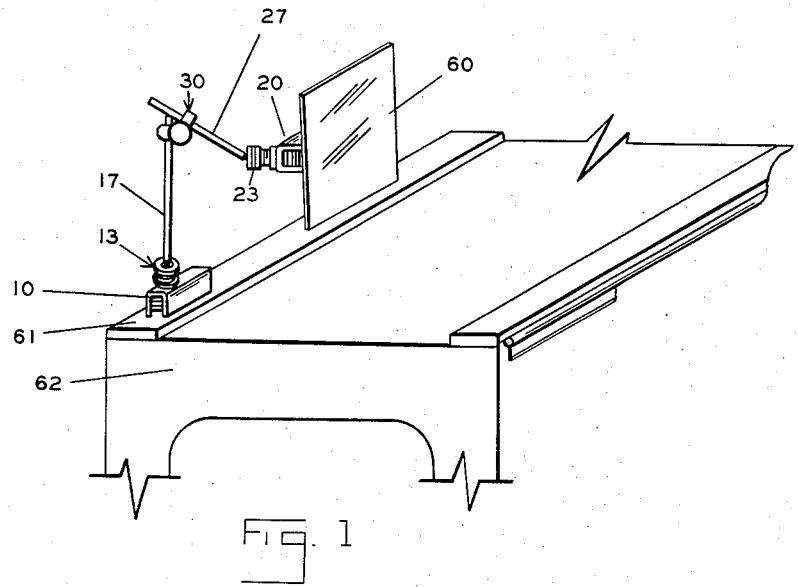
Fig. 1
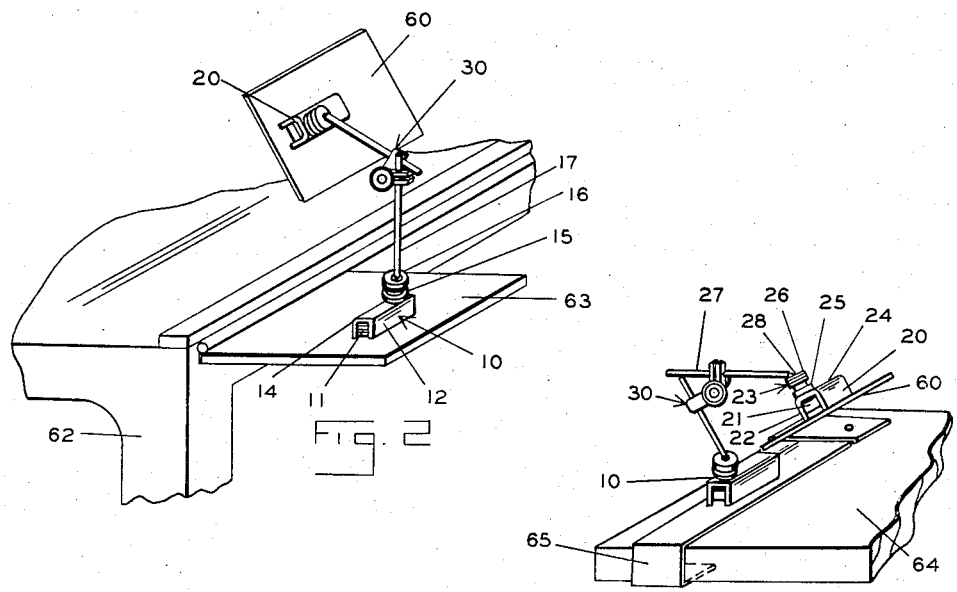
Fig. 2
Fig. 3
INVENTOR.
JAY L. PLYMALE
BY
Jerome R. Cox
ATTORNEY March 3, 1959
J. L. PLYMALE
2,876,359
MAGNETIC SUPPORT
Filed June 28, 1955
3 Sheets-Sheet 2
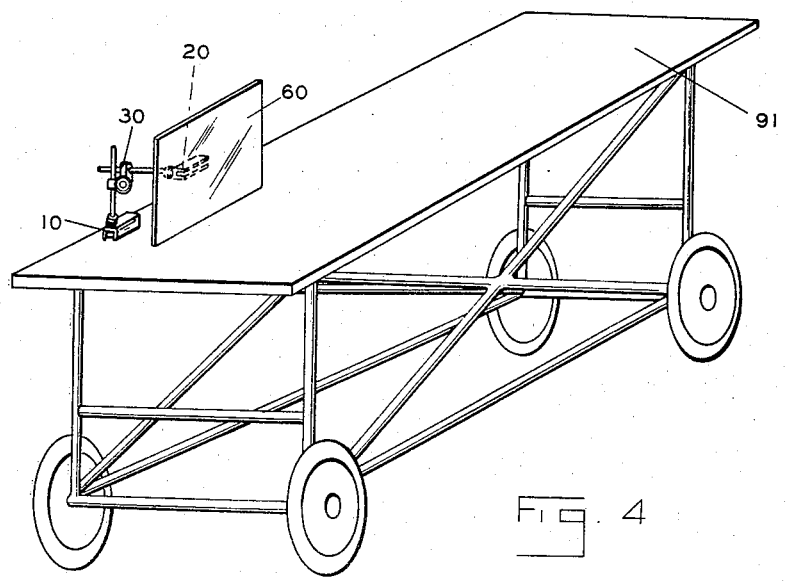
Fig. 4
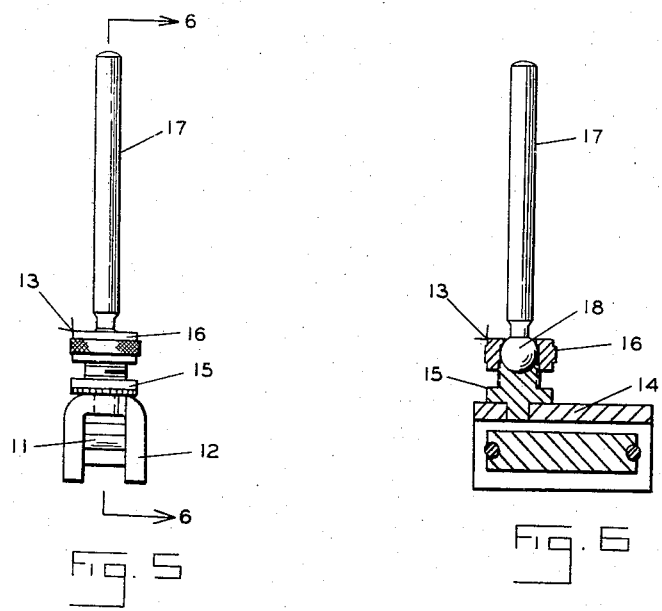
Fig. 5
Fig. 6
INVENTOR.
JAY L. PLYMALE
BY
*Jerome R. Cox*
ATTORNEY March 3, 1959     J. L. PLYMALE     2,876,359
MAGNETIC SUPPORT Filed June 28, 1955     3 Sheets-Sheet 3

INVENTOR.
JAY L. PLYMALE
BY
Jerome R. Cox
ATTORNEY

United States Patent Office 2,876,359
Patented Mar. 3, 1959

2,876,359

MAGNETIC SUPPORT

Jay Langley Plymale, Marion, Ohio

Application June 28, 1955, Serial No. 518,609

1 Claim. (Cl. 250—58)

The invention disclosed in this application relates generally to X-ray photography and, more particularly, to a universally adjustable support for magnetically holding the cassettes usually used in such X-ray photography.

To obtain the best results when taking X-ray photographs, the X-ray cassettes or film must be properly positioned relative to the subject matter to be X-rayed and held as steady as possible in that position. Further, it is desirable to support the X-ray cassettes or film, during the taking of X-ray photographs, by means other than those requiring cooperation of X-ray room personnel so that said personnel will not be exposed to dangerously large dosages of radiation. As is already known to those persons skilled in the art of X-ray photography, universally adjustable supports for X-ray cassettes have been designed which hold X-ray cassettes or film steady and in a multiplicity of adjusted positions during the taking of X-ray photographs and without the cooperation of X-ray room personnel. There are positions, however, in which it is desirable to hold X-ray cassettes or film, especially for taking lateral views during hip X-rays, skull X-rays, spine X-rays, and operative procedures on the bones of the arms and legs, which cannot be obtained when these known supports for X-ray cassettes are used. Moreover, such known supports are often bulky, cumbersome and awkward to use and adjust. For these reasons, among others, these known supports for X-ray cassettes have not proved entirely satisfactory and those persons engaged in X-ray photography have persisted in hand-holding the X-ray cassettes or film. This results in inferior X-ray photographs due to the inherent unsteadiness of the human hand and also subjects the person holding the X-ray cassettes or film to dangerously large and cumulative dosages of radiation.

Objects

It is therefore an object of my invention to provide an improved universally adjustable support for holding X-ray cassettes.

A further object of my invention is to provide a universally adjustable support for holding X-ray cassettes which is, among other uses, especially adaptable for taking lateral views during hip X-rays, skull X-rays, spine X-rays, and operative procedures on the bones of the arms and legs.

A further object of my invention is to provide a magnetic universally adjustable support for X-ray cassettes which may be completely sterilized and can hold an X-ray cassette whether sterile or not while enclosed in a sterile casette sack.

A further object of my invention is to provide a magnetic X-ray cassette holder adaptable to be readily and adjustably attached directly to an emergency room stretcher cart, facilitating the taking of X-rays without the dangerous necessity of hand-holding the cassette where the victims to be X-rayed are too seriously injured to allow them to be moved to the X-ray table.

A further object of my invention is to provide a universally adjustable support for holding V-ray cassettes which is of such compactness that it may be easily sterilized with other surgical instruments.

A further object of my invention is to provide a universally adjustable support for X-ray cassettes which is compact and easily and readily stored when not in use.

Other objects and a fuller understanding of the invention may be had by referring to the following description and claim, taken in conjunction with the accompanying drawings.

In the drawings:

Fig. 1 is a perspective view showing an X-ray cassette support constituting an embodiment of my invention attached directly to the steel side rail of an X-ray table and supporting an X-ray cassette;

Fig. 2 is a perspective view showing an X-ray cassette support constituting an embodiment of my invention attached directly to the steel "Bucky tray" of an X-ray table and supporting an X-ray cassette;

Fig. 3 is a perspective view showing an X-ray cassette support constituting an embodiment of my invention attached to a non-magnetic table top by means of a table adapting base strip and supporting an X-ray cassette;

Fig. 4 is a perspective view showing an X-ray cassette support constituting an embodiment of my invention attached to a steel stretcher cart commonly used to carry patients from the emergency room of a hospital and supporting an X-ray cassette;

Fig. 5 is a front elevational view of the magnetic base assembly constituting a sub-assembly of an embodiment of my invention;

Fig. 6 is a sectional view taken along line 6—6 of Fig. 5;

Figure 7:
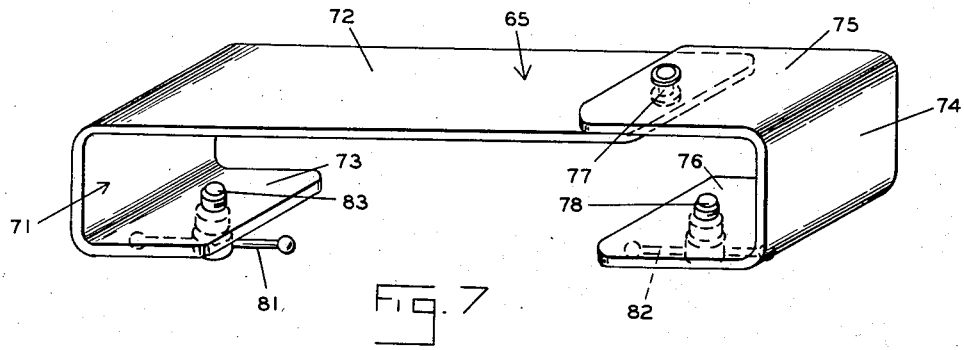
Fig. 7 is a perspective view of the base strip or strap shown on a larger scale than in Fig. 3.

Referring generally to Figs. 1, 2, 3 and 4, it will be seen that my X-ray cassette support has a magnetic base assembly 10 which is connected to and supports a magnetic holding assembly 20 for holding X-ray cassettes, such as X-ray cassette 60.

Referring still generally to Figs. 1, 2, 3 and 4, and particularly to Figs. 5 and 6, it will be seen that the magnetic base assembly 10 includes a magnetic base comprised of a powerful permanent magnet 11 partially encased within a channel shaped housing 12 having a roof 14 to which a ball socket 13 is brazed or welded. The socket 13 comprises a threaded base 15 having approximately a hemispherical cavity therein and a nut 16 having approximately a hemispherical cavity therein which cavities cooperate to form approximately a spherical cavity, for receiving a ball 18 formed at one end of a rod 17, when the nut 16 is threaded on the threaded base 15 so that the rod 17 may be rigidly secured to the magnetic base 11—12 in a multiplicity of pivotally adjustable positions relative thereto.

The magnetic holding assembly 20, which is connected to and supported by the magnetic base assembly 10, is substantially identical with the magnetic base assembly 10. It includes a magnetic holding means comprised of a powerful permanent magnet 21 partially encased within a housing 22 having a roof 24. To the roof 24 there is brazed or welded a ball socket 23, comprising a threaded base 25 and a nut 26 which receives a ball 28 formed at the end of a rod 27, so that the rod 27 may be rigidly secured to the magnetic holding means 21—22 in a multiplicity of pivotally adjustable positions; said parts corresponding respectively to magnet 11, housing 12, roof 13, socket 14, base 15, nut 16, ball 18, rod 17, and magnetic base 11—12, respectively.

Figures 8, 9:
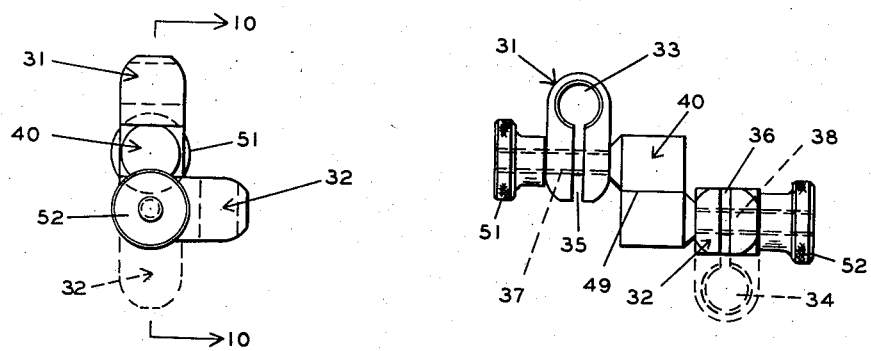
Fig. 8 is a side elevational view of the connecting means constituting a sub-assembly of an embodiment of my invention.
Fig. 9 is a front elevational view of the connecting means shown in Fig. 8.
Figure 10:
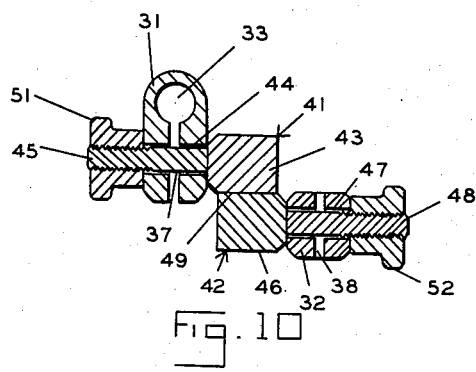
Fig. 10 is a sectional view taken along line 10—10 of Fig. 8.

Referring still generally to Figs. 1, 2, 3 and 4, and particularly to Figs. 8, 9 and 10, it will be seen that the magnetic base assembly 10 is connected to and supports the magnetic holding assembly 20 by means of an adjustable clamp 30. The clamp 30 comprises two blocks 31 and 32, each having a hole such as 33 and 34, respectively, of a diameter slightly larger than the diameter of the rods 17 and 27, respectively, the holes passing laterally through the said blocks adjacent to one end thereof and slidably receiving the rods 17 and 27, respectively. Each hole 33 and 34 is connected to the side of its associated block 31 and 32, respectively, farthest from the said hole by means of a rectangular slit or slot, such as 35 and 36, respectively, arranged so that the combined cross sectional shape of each said slot and its associated hole approximate the cross sectional shape of a keyhole. Each block 31 and 32 has an additional hole such as 37 and 38 respectively, passing through it adjacent to the end farthest from the hole 33 and 34, respectively, and arranged so that its longitudinal axis is perpendicular to the longitudinal axis of the hole 33 and 34, respectively, and also perpendicular to the longitudinal faces of slot 35 and 36, respectively.

Blocks 31 and 32 are adjustably connected to each other by means of connecting means 40, consisting of a pair of substantially identical machined parts 41 and 42, each comprising a block portion such as 43 and 46, respectively, having an outwardly extending integrally attached elongated pin, such as 44 and 47, respectively, and which parts are brazed or welded together as at 49 so that the pins 44 and 47 are parallel to each other and extend in opposite directions.

The pins 44 and 47 are received by the holes 37 and 38 respectively, of blocks 31 and 32, respectively. Each has a threaded portion such as 45 and 48, respectively, spaced inwardly from its outer extremity partially extending through the said holes 37 and 38, respectively, for threadably engaging a knurled locking nut, such as 51 and 52. The nuts 51 and 52 when tightened on the threaded portions 45 and 48, respectively, of pins 44 and 47, respectively, not only secure the slotted blocks 31 and 32 against rotation on the pins 44 and 47, respectively, but also by closing the gaps of slots 35 and 36, respectively, clamp the blocks 31 and 32 about the rods 17 and 27, respectively. Therefore, the rods 17 and 27 of assemblies 10 and 20, respectively, may be locked in a multiplicity of slidably adjustable positions as well as in a multiplicity of rotatably adjustable positions relative to the connecting means 40 and relative to each other.

Figs. 1, 2, 3 and 4 illustrate my invention in typical environments.

In Fig. 1, 62 is an X-ray table having a steel side rail 61 which provides a magnetic metal to which my new support may be magnetically attached while supporting the cassette holder 60.

In Fig. 2, the X-ray table 62 is shown having a steel "Bucky tray" 63 which provides a magnetic metal to which my new support may be magnetically attached while supporting the cassette holder 60.

In Fig. 3, 64 is a wooden hip board sometimes used in taking X-ray photographs. My cassette support is attached thereto by means of a metal base strip or strap 65, fixedly and adjustable adaptable to said hip board 64.

In Fig. 4, 91 is a hospital stretcher formed of ferrous metal to which the magnetic base assembly is magnetically attached. As in the other environments, the magnetic base assembly 10 is connected to and supports the magnetic holding assembly 20, which is shown holding an X-ray cassette 60 by means of clamp 30.

The base strip 65 is made from ferrous sheet metal such as sheet steel and, as is best shown in Fig. 7, generally comprises a "C" clamp 71, having a long upper arm 72 and a short lower arm 73, and a second "C" clamp 74, having a short upper arm 75 and a short lower arm 76, pivotally connected at the extremities of their respective upper arms 72 and 75 by means of a bolt or rivet 77. Threadably engaging the bottom legs 73 and 76 are bolts 77 and 78, respectively, having levers 81 and 82, respectively, slidably attached thereto to facilitate turning said bolts. The base strip 65 is slidably adaptable to surfaces such as table tops and the hip board 64 of Fig. 3, and may be locked in a multiplicity of adjusted positions by means of the bolts 77 and 78 to provide a magnetic metal to which my new support may be attached while supporting the cassette holder 60.

*Operation*

In operation, my X-ray cassette support is magnetically attached directly by means of the magnetic base assembly 10 to the steel parts of the X-ray table, stretcher cart, etc., and adjacent to the parts of the body to be X-rayed. If the location of the body part to be X-rayed is such that there are no steel parts adjacent thereto to which the X-ray cassette support may be directly attached, the base strip 65 is first attached to the table, or to a hip board or similar device if such is being used, and positioned adjacent to the body part to be X-rayed and locked in place by means of bolts 77 and 78, to which X-ray cassette support is then magnetically attached by means of the magnetic base assembly 10 adjacent to the body part to be X-rayed. The X-ray cassette (which may, if desired, be encased in a sterile X-ray cassette sack) is then magnetically attached to the magnetic holding assembly 20. The nuts 16 and 26 may be loosened to allow rods 17 and 27 to pivot about the bolts 18 and 28, respectively. Nuts 51 and 52 may be loosened to allow the stems of rods 17 and 27 to slidably move in the holes 33 and 34 respectively as well as to allow blocks 31 and 32 to pivot about pins 44 and 47, respectively. The X-ray cassette is thus brought to the desired position for taking the X-ray photograph. As the X-ray cassette is being moved into position, the rods 17 and 27 may pivot about the ball 18 and 28, respectively, the stems of rods 17 and 27 may slidably move in holes 33 and 34, respectively, and blocks 31 and 32 may pivot about pins 44 and 47, respectively, so that they will take the relative positions necessary to support the X-ray cassette in the desired position. After the X-ray cassette is properly positioned, nuts 16 and 26 are tightened to prevent further pivoting of rods 17 and 27 about balls 18 and 28, respectively; and nuts 51 and 52 are tightened to prevent further sliding movement of rods 17 and 27 in holes 33 and 34, respectively, and to prevent further pivoting of blocks 31 and 32 about pins 44 and 47, respectively. The X-ray cassette is thus held exactly as desired.

The invention has been described with reference to a preferred embodiment and it will be understood that many variations and modifications thereof may be resorted to without departure from the scope of the invention as defined in the following claim.

I claim:

A magnetic support for X-ray cassettes comprising in combination a magnetic base and comprising a threaded base having a substantially hemispherical cavity formed therein and a nut threaded on said threaded base and having a substantially hemispherical cavity formed therein and cooperating with the cavity in the base to form a substantially spherical cavity, a ball socket rigidly secured to said magnetic base, a rod having a ball formed on one end and positioned in said ball socket so that said rod is adjustably connected to and supported by said magnetic base, a clamp having two receiving apertures which are adjustably positioned angularly to each other and in one of which the end of said rod opposite to the end having the positively attached ball is clamped, a second rod having one end clamped in said second aperture of said clamp and having a ball formed on the end opposite to said clamped end, a second ball socket which comprises a threaded base having a substantially hemispherical cavity formed therein and a nut threaded on said threaded base and having a substantially hemispherical cavity formed therein and cooperating with the cavity in the base to form a substantially spherical cavity and in which the ball of said second rod is received, and a magnet rigidly secured to the base of said second ball socket so that said magnet is adjustably connected to and supported by said second rod whereby an X-ray cassette may be held magnetically in any desired adjusted position by said magnet.

References Cited in the file of this patent

UNITED STATES PATENTS

| | | |
|---|---|---|
| 1,352,647 | Benton | Sept. 14, 1920 |
| 2,366,350 | Ostling | Jan. 2, 1945 |
| 2,651,725 | McFarland | Sept. 8, 1953 |
| 2,654,022 | Adamy et al. | Sept. 29, 1953 |
| 2,743,353 | Nicholson et al. | Apr. 24, 1956 |
| 2,760,744 | Watrous | Aug. 28, 1956 |

OTHER REFERENCES

American Machinist, Nov. 8, 1945, pg. 126.

UNITED STATES PATENT OFFICE

CERTIFICATE OF CORRECTION

Patent No. 2,876,359                             March 3, 1959

Jay Langley Plymale

It is hereby certified that error appears in the printed specification of the above numbered patent requiring correction and that the said Letters Patent should read as corrected below.

Column 2, line 1, for "V-ray" read -- X-ray --; column 3, line 67, for "adjustable" read -- adjustably --.

Signed and sealed this 16th day of June 1959.

(SEAL)
Attest:

KARL H. AXLINE                                      ROBERT C. WATSON

Attesting Officer                                    Commissioner of Patents